3,135,797
AROMATIC AMINO ANTISPASMODIC COMPOUNDS

John H. Biel, Milwaukee, Wis., assignor, by mesne assignments, to Colgate-Palmolive Company, a corporation of Delaware
No Drawing. Filed Apr. 15, 1958, Ser. No. 728,565
5 Claims. (Cl. 260—570.6)

This invention relates to antispasmodic compounds which relieve the spasms of smooth muscles, particularly those of the gastro-intestinal tract, the lung, and the vascular system, and to new intermediates from which they are produced.

This application is a continuation-in-part of my copending applications Serial No. 469,305, filed November 16, 1954, now abandoned, and Serial No. 669,412, filed July 2, 1957, now abandoned; Serial No. 469,305 is a continuation-in-part of my application Serial No. 230,249, filed June 6, 1951, now abandoned.

A great deal of work has been done in developing antispasmodic compounds such as epinephrine to relieve the spasma of smooth muscles in the gastrointestinal tract and the bronchial tubes. In evaluating the usefulness of these antispasmodics, five interrelated factors need to be considered, (1) bronchodilator activity, (2) general antispasmodic activity, (3) period of effectiveness, i.e., whether the action is fleeting or prolonged, (4) deleterious side effects, and (5) the modes in which the substance may be effectively administered. The clinical usefulness of these compounds is greatly limited in that they have a weak and fleeting action, a high incidence of undesirable and sometimes deleterious side effects, and/or are limited by the mode in which they can be administered.

I have discovered and synthesized a group of new, superior antispasmodic compounds of the formula

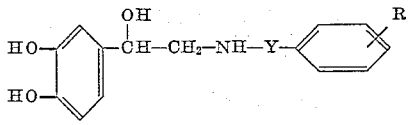

Formula I and nontoxic acid addition salts thereof, wherein Y is a straight or branched lower alkylene group of at least three and up to 5 carbons and R is a substituent on the phenyl group of the group consisting of lower alkoxy, halo, hydroxy, and lower alkylenedioxy groups. Experiments indicate that they have strong, lengthy bronchodilator and general antispasmodic action and little or no incidence of undesirable side effects. The compounds may be injected or administered orally.

The compounds of Formula I are more active bronchodilators than the corresponding compounds in which the phenyl group is unsubstituted (R is hydrogen) and this is particularly so in humans. In addition, those compounds in which Y is a tertiary branched lower alkylene group are considered more useful than the compounds in which Y is a straight chain (secondary) alkylene group or a branched quaternary alkylene group. Also, the presence of a methyl group on the carbon alpha to the nitrogen group often favors increased activity. The most useful compounds of the series are those in which Y is a 2-isopropyl group and R is a 3,4-methylenedioxy or a p-methoxy group on the phenyl group.

The production of these compounds is readily effected by reacting chloroacetylcatechol with a nuclear substituted phenylalkylamine to produce an intermediate 3,4-dihydroxyphenyl N-(substituted phenylalkyl)-aminomethyl ketone which is then reduced to the corresponding alpha-(3,4-dihydroxyphenyl)-beta-(N - substituted phenylalkyl)-amino ethanol.

This process may be represented as follows:

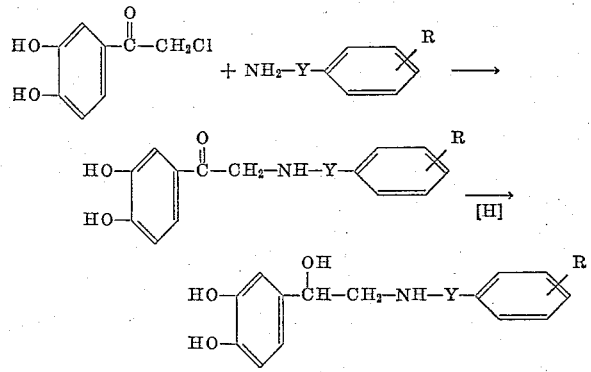

wherein Y and R have the significance previously assigned.

Some of the nuclear substituted phenylalkyl amines which may be used in this process are p-methoxyphenylisopropylamine, o-chlorophenylisopropylamine, m,p-methylenedioxyphenylisopropylamine, p-hydroxyphenylisopropylamine, m,p-methylenedioxyphenylpropylamine, 1-p-hydroxyphenyl-3-amino butane and 1-p-methoxyphenyl-4-amino pentane.

The reaction between chloroacetylcatechol and the nuclear substituted phenylalkyl amine is readily effected in aqueous alcohol at an elevated temperature such as the reflux temperature. From 1 to 6 hours is adequate to essentially complete the reaction. The product may be recovered from the reaction mixture by conventional processes such as evaporating the mixture to dryness and recrystallizing the product, generally as an acid addition salt and preferably the hydrochloride, from a lower alcohol such as isopropanol.

Some of the specific intermediate ketones produced in this way are the compounds of the formula

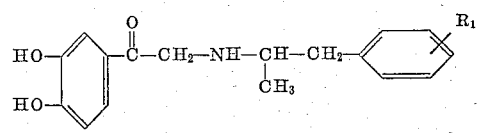

in which $R_1$ is a p-methoxy, o-chloro, p-hydroxy or m,p-methylenedioxy group on the phenyl group. Other specific compounds produced in this way are 3,4-dihydroxyphenyl N-[3-(1-p-methoxyphenylbutyl)]-aminomethyl ketone, 3,4-dihydroxyphenyl N-(4-p-hydroxyphenylbutyl)-aminomethyl ketone and 3,4-dihydroxyphenyl N-[4-(1-m,p-methylenedioxyphenylpentyl)]-aminomethyl ketone.

These and similar ketones within the scope of this invention are readily reduced catalytically in aqueous alcohol to the corresponding alcohols or arterenols. Palladium or platinum may be used as the catalyst and hydrogen pressures of 40 to 60 p.s.i. Temperatures from room temperature to about 50° C. may be employed for the reduction. The reduction is usually considered completed when hydrogen uptake has about ceased or leveled off. For the reduction the ketone is advisably employed in the form of an acid addition salt such as the hydrochloride, sulfate, maleate or citrate. The reaction product may be recovered from the reaction mixture by conventional methods. The product of reduction will, of course, be the alcohol in the form of the corresponding acid addition salt. Conversion from a salt to the free base is readily achieved by adding a base, such as sodium hydroxide, to an aqueous solution of the salt.

Some of the specific derivatives produced in this way are the compounds of the formula

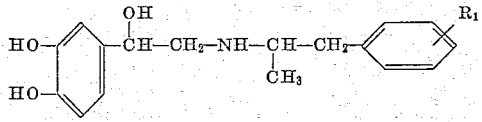

in which $R_1$ is a p-methoxy, o-chloro, p-hydroxy or m,p-methylenedioxy group on the phenyl group. Other specific compounds produced in this way are alpha-(3,4-dihydroxyphenyl) - beta - (N - p - methoxyphenylpropyl)-amino ethanol, alpha-(3,4-dihydroxyphenyl)-beta-(N-p-hydroxyphenylisobutyl)-amino ethanol and alpha-(3,4-dihydroxyphenyl) - beta - [N - 4 - (1 - p - hydroxyphenylpentyl)]-amino ethanol.

The production of alpha-(3,4-dihydroxyphenyl)-beta-(N-3',4'-methylenedioxyphenyl)-isopropylamino ethanol by catalytic reduction of the intermediate ketone yields a mixture of diastereoisomers of this alcohol. These diastereoisomers may be separated readily by incorporating the diastereoisomeric mixture of alpha-(3,4-dihydroxyphenyl) - beta - (N - 3',4' - methylenedioxyphenyl) - isopropylamino ethanol as the hydrochloride salt in hot isopropyl alcohol. The fraction insoluble in hot isoprpyl alcohol is the diastereoisomer melting at 170–172° C. as the hydrochloride while the soluble diastereoisomer melts at 125–127° C. dec. as the hydrochloride.

These fractions were proven to be two disatereoisomers of alpha-(3,4-dihydroxyphenyl)-beta-(N-3',4'-methylenedioxyphenyl) isopropylamino ethanol hydrochloride since:

(1) Assays for carbon, hydrogen, nitrogen and chlorine were identical for both fractions within experimental limits.

(2) The two fractions could not be separated by chromatographic adsorption.

(3) Identical ultraviolet and near-infrared spectra were obtained.

(4) The two fractions gave different infrared spectra as diastereoisomers often do.

(5) Different X-ray diffraction patterns were obtained for the two fractions indicating different crystalline structures.

(6) One fraction could not be converted to the other by crystal seeding. This rules out the possibility of polymorphism.

In normal clinical use the compounds will be employed in salt form and it is to be understood that the claims hereof cover the salts as well as the free bases. The activity of the compounds is independent of whether they are in salt form or otherwise. Salts may be prepared by any of the well known methods. While the salt normally employed is the hydrochloride, I have prepared other salts such as the acetate, sulfate and tartrate.

Alpha - (3,4 - dihydroxyphenyl) - beta - (3',4' - methylenedioxyphenyl)-isopropylamino ethanol is considered to be the best bronchodilator of these novel compounds. It is safe and effective both in animals and humans. The high melting diastereoisomer of this compound is advisably used, and preferably as the hydrochloride salt although other nontoxic salts may be employed if desired.

The following are representative pharmaceutical formulations which may be used to administer the active agents of this invention and particularly alpha-(3,4-dihydroxyphenyl) - beta - (N-3',4' - methylenedioxyphenyl) - isopropylamino ethanol hydrochloride which is referred to in the formulations as JB–251.

A. Each tablet contains:
    JB 251 _____ mg__ 2.00
    Powdered sugar, U.S.P. _____ mg__ 204.12
    Starch, U.S.P. _____ Q.s.
    Glucose, U.S.P. (added as glucose solution, for
        granulation) _____ Q.s.
    Talc, U.S.P. _____ Q.s.
    Magnesium stearate, U.S.P. _____ mg__ 1.52

B. Each tablet contains:
    Pentobarbital, N.N.R. specifications ___ mg__ 32.00
    JB 251 _____ mg__ 2.00
    Powdered sugar, U.S.P. _____ mg__ 181.44
    Glucose, U.S.P. (added as glucose solution, for
        granulation) _____ Q.s.
    Starch, U.S.P. _____ Q.s.
    Talc, U.S.P. _____ Q.s.
    Magnesium stearate, U.S.P. _____ mg__ 1.52

C. Each tablet contains:
    JB 251 _____ mg__ 2.50
    Powdered sugar, U.S.P. _____ mg__ 204.12
    Starch, U.S.P. _____ Q.s.
    Glucose, U.S.P. (added as glucose solution, for
        granulation) _____ Q.s.
    Talc, U.S.P. _____ Q.s.
    Magnesium stearate, U.S.P. _____ mg__ 1.52

D. Each tablet contains:
    Pentobarbital, N.N.R. specifications ___ mg__ 32.00
    JB 251 _____ mg__ 2.50
    Powdered sugar, U.S.P. _____ mg__ 181.44
    Starch, U.S.P. _____ Q.s.
    Glucose, U.S.P. (added as glucose solution, for
        granulation) _____ Q.s.
    Talc, U.S.P. _____ Q.s.
    Magnesium stearate, U.S.P. _____ mg__ 1.52

The tablets are prepared by combining the JB–251, sugar, starch and glucose, mixing well, drying the mixture and grinding it with the talc and magnesium stearate. The tablets are then pressed from the mixture.

E. For inhalation, each cc. contains:
    JB 251 _____ mg__ 5.0
    Chlorobutanol, hydrous, U.S.P. _____ mg__ 5.0
    Sodium bisulfite, U.S.P. _____ mg__ 1.0
    Propylene glycol, U.S.P. _____ cc__ 0.8
    Distilled water, U.S.P. XIV _____ Q.s.

F. For inhalation, each cc. contains:
    JB 251 _____ mg__ 10.0
    Chlorobutanol, hydrous, U.S.P. _____ mg__ 5.0
    Sodium bisulfite, U.S.P. _____ mg__ 1.0
    Propylene glycol, U.S.P. _____ cc__ 0.8
    Distilled water, U.S.P. XIV _____ Q.s.

G. For injection, each cc. contains:
    JB 251 _____ mg__ 0.5
    Chlorobutanol, hydrous, U.S.P. _____ mg__ 5.0
    Sodium metabisulfite, A.R. _____ mg__ 1.0
    Water for injection, U.S.P. _____ Q.s.

The inhalation and injection liquids are prepared by adding the materials to the liquid under sterile conditions.

The following examples illustrate the preparation of specific compounds within the scope of this invention.

EXAMPLE 1

*3,4-Dihydroxyphenyl N-(o-Chlorophenylisopropyl)-Aminomethyl Ketone Hydrochloride*

A solution containing 15 g. (0.081 mole) of chloroacetyl catechol dissolved in 75 cc. of hot ethanol was added to 40 g. (0.23 M) of o-chlorophenylisopropylamine dissolved in 80 cc. of 60% aqueous ethanol at 60° C. Stirring and heating were continued for another two hours. The reaction mixture was cooled and acidified with 15 cc. of conc. HCl and then concentrated in vacuo to a viscous consistency. The residue was dissolved in hot acetone and seeded with crystals obtained from methyl ethyl ketone crystallization. On cooling, 13 g. of solid appeared which was removed by filtration. The filtrate was concentrated and the residue crystallized from methyl ethyl ketone, yield 19 g., M.P. 170–180° C. The solid was suspended in 125 cc. of hot isopropyl alcohol and the mixture allowed to cool to room temperature; 9 g. were recovered on filtration, M.P. 201–203° C.

Analysis.—Calcd. for $C_{17}H_{19}Cl_2NO_3$: Cl, 19.92; N, 3.93. Found: Cl, 20.00; N, 4.02.

EXAMPLE 2

α-(3,4-Dihydroxyphenyl)-β-(N-o-Chlorophenylisopropyl)-Amino Ethanol Hydrochloride Three grams of the ketone of Example 1 were dissolved in absolute ethanol and reduced with 0.1 g. of platinum oxide at 60 p.s.i. of hydrogen. The catalyst was removed by filtration and the filtrate concentrated to dryness. The residue was taken up with acetone and a very hygroscopic solid isolated, M.P. 70° C. dec.

EXAMPLE 3

3,4-Dihydroxyphenyl-N-(3',4'-Methylenedioxyphenyl)-Isopropylaminomethyl Ketone Hydrochloride To 56 g. (0.31 M) of 3,4-methylenedioxyphenylisopropylamine in 80 cc. of 60% aqueous ethanol were added 20 g. (0.11 M) of chloroacetyl catechol in 100 cc. of absolute ethanol. The mixture was stirred and heated at 70° C. for 6 hours, cooled and acidified with 20 cc. of conc. HCl. On cooling, 17 g. (43%) of product separated, M.P. 225–227° C. dec. After suspension in hot isopropyl alcohol 16.5 g. of the solid were recovered, M.P. 232–234° C. dec.

Analysis.—Calcd. for $C_{18}H_{20}ClNO_5$: Cl, 9.70; N, 3.84. Found: Cl, 9.59; N, 3.84.

EXAMPLE 4

α-(3,4-Dihydroxyphenyl)-β-(N-3',4'-Methylenedioxyphenyl)-Isopropylamino Ethanol Hydrochloride Fifteen grams (0.043 M) of the ketone of Example 3 dissolved in 300 cc. of 50% aqueous ethanol were subjected to hydrogenation with 2 g. of 10% palladium-on-charcoal catalyst at 60 p.s.i. of hydrogen. The catalyst was removed by filtration and the filtrate concentrated to dryness. The residue was crystallized from hot acetone, M.P. 126–127° C. dec., yield 9.0 g. (65%).

Analysis.—Calcd. for $C_{18}H_{22}ClNO_3$: Cl, 9.68; N, 3.81. Found: Cl, 9.60; N, 3.76.

The base was prepared by neutralization of an aqueous solution of the hydrochloride salt with an equivalent amount of 1.06 N sodium hydroxide solution; M.P. 163° C.

Analysis.—Calcd. for $C_{18}H_{21}NO_5$; N, 4.24. Found: N, 4.12.

EXAMPLE 5

3,4-Dihydroxyphenyl-N-(4-Methoxyphenylisopropyl)-Aminomethyl Ketone Hydrochloride To 50 g. (0.30 M) of p-methoxyphenylisopropylamine in 80 cc. of 60% aqueous ethanol were added 18.5 g. (0.10 M) of chloroacetyl catechol in 100 cc. of ethanol during a period of one hour at 60–65° C. Heating and stirring were continued for 5 hours, the reaction mixture acidified with 20 cc. of conc. HCl and concentrated to a viscous consistency. The residue was suspended twice in 600 cc. of hot isopropyl alcohol and the mixture filtered hot, yield 14 g. (39%), M.P. 203–205° C. dec.

Analysis.—Calcd. for $C_{18}H_{22}ClNO_4$: Cl, 10.11; N, 3.99. Found: Cl, 9.89; N, 3.97.

EXAMPLE 6

α-(3,4-Dihydroxyphenyl)-β-(N-4-Methoxyphenylisopropyl)-Aminoethanol Hydrochloride An alcoholic solution containing 7.0 g. (0.02 M) of the ketone of Example 5 was subjected to hydrogenation with 0.2 g. $PtO_2$ as in Example 2; the product was isolated as shown in Example 4, yield 3.6 g. (60%), M.P. 122–123° C. dec.

Analysis.—Calcd. for $C_{18}H_{24}ClNO_4$: Cl, 10.05; N, 3.97. Found: Cl, 9.86; N, 3.97.

EXAMPLE 7

3,4-Dihydroxyphenyl N-(2-Methoxyphenylisopropyl)-Aminomethyl Ketone Hydrochloride This compound was prepared by the procedure described in Example 5 using o-methoxyphenylisopropylamine; yield 35%, M.P. 183–185° C.

Analysis.—Calcd. for $C_{18}H_{22}ClNO_4$: Cl, 10.11; N, 3.99. Found: Cl, 10.26; N, 4.00

EXAMPLE 8

α-(3,4-Dihydroxyphenyl)-β-N-(2-Methoxyphenylisopropyl)-Aminoethanol Hydrochloride This compound was prepared by the reduction of the ketone of Example 7, according to the procedure outlined in Example 4; yield 60%, M.P. 130–131° C.

Analysis.—Calcd. for $C_{18}H_{24}ClNO_4$: Cl, 10.05; N, 3.97. Found: Cl, 9.95; N, 3.85.

EXAMPLE 9

3,4-Dihydroxyphenyl N-(4-Hydroxyphenylisopropyl)-Aminomethyl Ketone Hydrobromide Fifty grams of the p-methoxy compound of Example 5 was treated with 500 cc. of 48% aqueous hydrobromic acid and the mixture refluxed with stirring for 2 hours and the crude product isolated by filtration on cooling. After recrystallization from 230 cc. of water, the product melted at 155–157° C. dec., yield 43.6 g. (90%).

Analysis.—Calcd. for $C_{17}H_{20}BrNO_4$: Br, 20.95; C, 53.56; H, 5.27; N, 3.67. Found: Br, 21.01; C, 53.41; H, 5.72; N, 3.56.

The hydrochloride salt was prepared by dissolving 41.6 g. of the hydrobromide salt in 218 cc. of hot water and treating the solution with 252 cc. of conc. hydrochloric acid solution, yield 29 g., M.P. 163–165° C.

Analysis.—Calcd. for $C_{17}H_{20}ClNO_4$: Cl, 10.51; N, 4.15. Found: Cl, 10.88; N, 3.97.

EXAMPLE 10

α-(3,4-Dihydroxyphenyl)-β-N-(4-Hydroxyphenylisopropyl)-Aminoethanol Hydrochloride A methanolic solution containing 28.5 g. (0.075 mole) of the ketone .HCl of Example 9 was reduced with 4.5 g. of 10% palladium-on-carbon catalyst and the product crystallized from acetone, M.P. 89–91° C. dec.

Analysis.—Calcd. for $C_{17}H_{22}ClNO_4$: Cl, 10.45; N, 4.12. Found: Cl, 10.42; N, 3.90.

The hydrobromide salt obtained from the ketone .HBr of Example 9 melted at 95° C. dec.

Analysis.—Calcd. for $C_{17}H_{22}BrNO_4$: Br, 20.85; N, 3.65. Found: Br, 20.71; N, 3.72.

EXAMPLE 11

High Melting α-(3,4-Dihydroxyphenyl)-β-(N-3',4'-Methylenedioxyphenyl)-Isopropylamino Ethanol A mixture containing 25.7 g. (0.07 mole) of 3,4-dihydroxyphenyl (N-3',4'-methylenedioxyphenyl)-isopropylaminomethyl ketone hydrochloride, 2.0 g. of 10% palladium-on-charcoal catalyst and 300 cc. of 66% aqueous ethanol was subjected to hydrogenation at 60 p.s.i. of hydrogen. After hydrogen uptake was completed the catalyst was removed by filtration in an atmosphere of carbon dioxide. The solvent was recovered from the filtrate by vacuum distillation and the residue dissolved in hot acetone (300 cc.). On standing, a crystalline precipitate appeared which was collected by filtration, yield 23 g. (89%), M.P. 150–151° C.

The above precipitate was suspended in 75 cc. of hot isopropyl alcohol and the mixture allowed to reflux for one hour. The insoluble material was separated by filtering the hot suspension and 15.6 g. (68%) of the high melting diastereoisomer α-(3,4-dihydroxyphenyl)-β-(N-3',4'-methylenedioxyphenyl)-isopropylamino ethanol hydrochloride was obtained, M.P. 170–171° C.

An aqueous solution of the hydrochloride salt (3.67 g. in 100 cc. of water) was clarified by filtration and then neutralized with 9.5 cc. of 1.06 N aqueous sodium hydroxide. A white product precipitated and was isolated by filtration. The precipitate of alpha-(3,4-dihydroxyphenyl)-beta-(N - 3',4' - methylenedioxyphenyl)-isopropylamino ethanol was washed with acetone, yield 3.2 g. (97%), M.P. 163° C. dec.

*Analysis.*—Calcd. for $C_{18}H_{21}NO_5$: N, 4.24. Found: N, 4.12.

Various changes and modifications of the invention can be made and, to the extent that such variations incorporate the spirit of this invention, they are intended to be included within the scope of the appended claims.

What is claimed is:

1. A member of the group consisting of compounds of the formulae

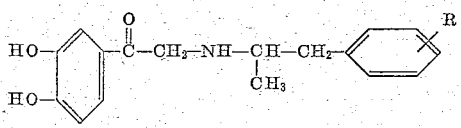

and

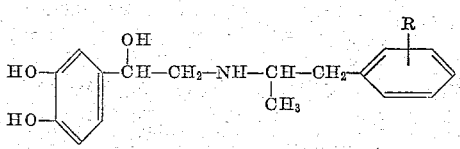

wherein R is a member of the group consisting of lower alkoxy, halo and hydroxy, and nontoxic acid addition salts thereof.

2. Compounds of the formula

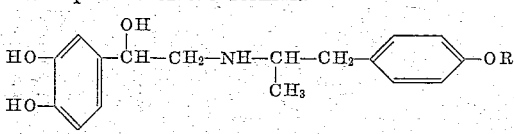

wherein R is lower alkyl.

3. Compound of the formula

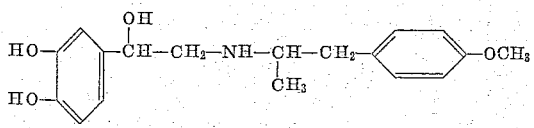

4. Compound of the formula

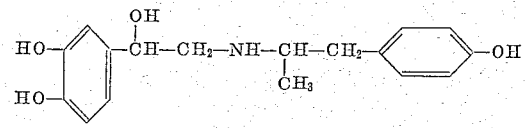

5. Compound of the formula

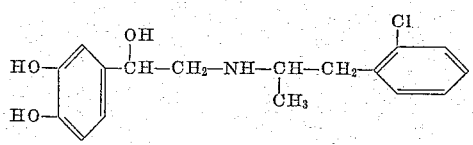

References Cited in the file of this patent

UNITED STATES PATENTS

| | | |
|---|---|---|
| 1,913,520 | Stolz et al. | June 13, 1933 |
| 1,964,973 | Bockmuhl et al. | July 3, 1934 |
| 2,061,136 | Bockmuhl et al. | Nov. 17, 1936 |
| 2,088,941 | Bockmuhl et al. | Aug. 3, 1937 |
| 2,483,885 | Crooks et al. | Oct. 4, 1949 |
| 2,506,588 | Goodson et al. | May 9, 1950 |
| 2,545,094 | Long et al. | Mar. 13, 1951 |
| 2,711,428 | Goodson et al. | June 21, 1955 |

FOREIGN PATENTS

| | | |
|---|---|---|
| 371,490 | Great Britain | Apr. 28, 1932 |
| 723,940 | Great Britain | Feb. 16, 1955 |
| 497,436 | Belgium | Dec. 1, 1950 |
| 263,801 | Switzerland | Dec. 16, 1949 |

OTHER REFERENCES

Surrey: Journal of the American Chemical Society, vol. 70, page 2887 (1948).

Moed et al.: "Rec. des Trav. Chim. des Pays-Bas," vol. 74, pp. 919–24 (1955).